Figure 1:
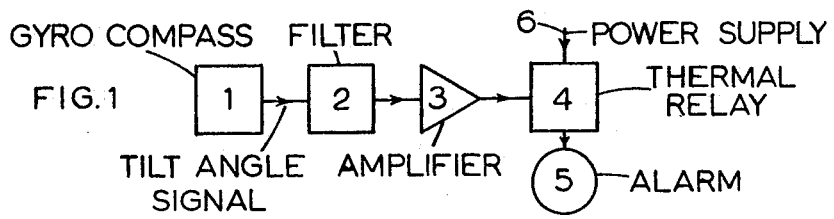

Sept. 27, 1966  D. BARNETT ETAL  3,274,696
GYROSCOPIC COMPASSES
Filed July 19, 1965

INVENTORS.
Douglas Barnett
David Langton Brook
by Eugene E. Stevens
ATTORNEY

United States Patent Office 3,274,696
Patented Sept. 27, 1966

3,274,696
GYROSCOPIC COMPASSES
Douglas Barnett, Northwood, and David Langton Brook, Watford, England, assignors to S. G. Brown, Ltd., Watford, England, a company of Great Britain
Filed July 19, 1965, Ser. No. 472,998
11 Claims. (Cl. 33—226)

This application is a continuation-in-part of our earlier application Serial No. 210,340 filed July 17, 1962, now abandoned, and, as in that case, concerns gyroscopic compasses and, more specifically relates to means providing an indication if deviation of such a compass in azimuth from its settled position, for instance, north, beyond a predetermined limit occurs.

It is well known in the practical usage of gyro-compasses that any azimuthal deviation of the compass from its settled position, whether caused by external or internal disturbances, will in the large majority of cases be accompanied by a change in its tilt angle; further, this tilt angle may be continuously monitored by means of a pendulum or similar gravity-sensing device, referred to hereinafter as a pendulum.

For the purpose of checking azimuthal deviation of a gyroscopic compass from its settled position therefore, the change from a preset datum of a pendulum signal generated in that compass can be employed to produce and indication of that deviation. As above stated, the main indication contemplated is that of deviation in excess of a given value and this is generally in the form of an alarm; an indicator might, however, operate in any other manner.

By reason, however, of horizontal accelerations imparted to the compass, which may, for example, be caused by the rolling and/or pitching motion of the vessel on which the compass is installed, the pendulum signal is composed of two factors, namely, a signal due to the tilt angle of the compass and transients arising from the motion of the vessel. It is an object of the invention to provide a method and means whereby the indicating or corrective means shall function only when the predetermined deviation in azimuth is exceeded. The invention accordingly provides that the pendulum signal component associated with the second of the afore-mentioned two factors is suppressed or at least attenuated to such a degree that the component due to the first of such factors will predominate in the action of triggering off the indicating means.

It is found that in practice the frequency spectrum of the motion of a typical vessel using a gyro-compass is generally in the band 3–15 cycles per minute (20–4 seconds period). This arises principally from pitch and roll, and more particular frequency spectra will usually be 3–10 cycles per minute for larger vessels and up to 15 cycles per minute for smaller, fast vessels. Again, the relevant frequencies may be higher still if account is taken of vibration.

However, the characteristic frequency of a gyro-compass error is in the region of 0.01 cycle per minute (100 minute period). Clearly, this is of a quite different order and can be regarded as a steady-state signal relative to the transient or periodic signals due to the motion of the vessel. In addition, as a result of some defect or mal-adjustment, a gyro-compass may settle with its spin axis not lying in the meridian plane: usually in such cases, the spin axis settles out of the horizontal plane and such a posture can also be regarded as part of the steady state.

On this basis, the present invention can be put into effect by including in the circuits of the check indicator a low-pass filter which acts upon the periodic signal component of the pendulum signal, but leaves the steady state signal component undisturbed, the corner frequency of the filter being suitably of the order of 2–5 cycles per minute. In practice, with such an arrangement, a proportion of the undesired periodic signal component does appear at the output of the filter, but this can be used as explained below.

In one example of the present invention, the pendulum signal is filtered and amplified, and applied to a sensing switch for triggering off the alarm or corrective mechanism, which switch is suitably in the form of a thermal relay preferably having a time constant of the order of 3 minutes. Consequently, if the compass is continuously displaced in tilt so that the mean pendulum signal exceeds a specified threshold value, the alarm will operate after a short time delay.

In such a case, the threshold value is determined by the power fed to the thermal relay from the amplifier. If the latter is linear, the total power fed to the relay will be that due to the steady-state signal component plus that arising from any unfiltered periodic signal component. Thus, if a periodic signal component, no matter how small, is present at the input to the amplifier, then a steady-state signal component could trigger the alarm or corrective means when actually less than the design value, that is to say, less than the value of a constant signal which would just cause the thermal relay to operate. To overcome this drawback, a non-linear amplifier is employed and is operated near its saturation level: that is to say, the maximum power that the amplifier is capable of delivering is only slightly greater than that needed to actuate the relay. The amplifier characteristics are so selected that, with the steady-state signal at its designed actuation value, the superimposition of a periodic signal component will cause the power delivered by the amplifier which is effective for actuation of the relay to be reduced. From this it follows that when a periodic signal is present at the amplifier input, the steady-state signal must have a value greater than the design value in order to operate the alarm. Hence, by appropriate choice of amplifier characteristics and of the threshold operating point, the above two opposing factors may be made to cancel each other, and the effect of unfiltered periodic signal components thereby eliminated if desired. Also, it has been found suitable to so choose the threshold operating point that, on large periodic motions of the vessel, the allowable change in steady-state signal, and therefore in the heading, before actuation of the alarm or corrective means is somewhat increased.

In practice, it is advantageous under certain circumstances to employ a feedback amplifier and to insert a filter in the feedback loop. Operation may be by means of a D.C. or A.C. input signal, and in the latter case a modulated 400 c.p.s. signal has been found successful.

Regarding forms of filter suitable for use with the present invention, this is not critical and the filter can be regarded simply as one having the transfer function $1/(1+\tau s)$ where $s$ is the Laplace operator. From the earlier comments regarding the filter corner frequency, it will be seen that $\tau$ will normally be chosen to have values appropriate to a frequency of the order of 2–5 cycles per minute, that is to say $\tau$ will lie between 30 and 12 seconds.

Figure 2:
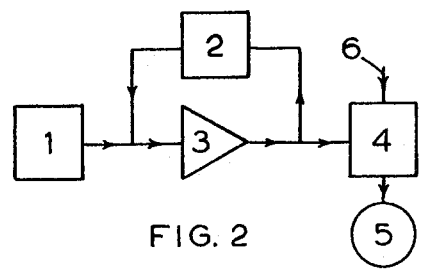
Figure 3:
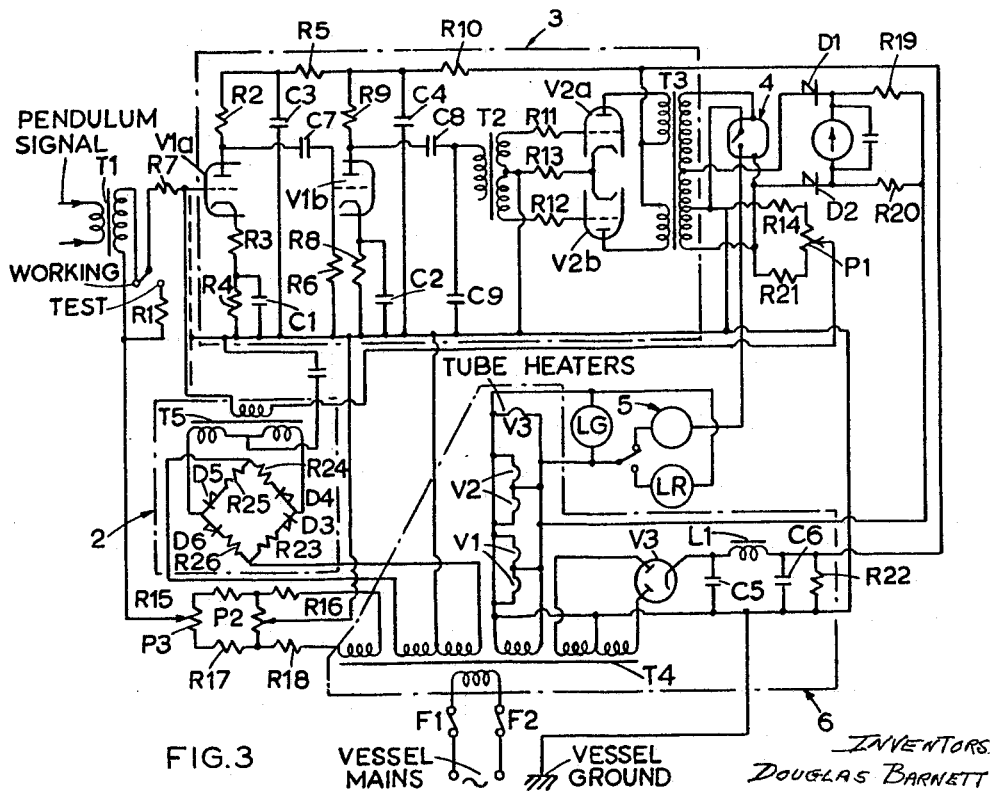

For a better understanding of the invention, reference will now be made, by way of example, to the accompanying drawings, in which:

FIGURE 1 illustrates in schematic manner one mode of connecting apparatus elements in accordance with the invention as discussed above, FIGURE 2 similarly illustrates a second mode of such connection, and FIGURE 3 is a circuit diagram of a gyro-compass azimuth monitor according to the invention.

Referring to FIGURE 1, reference numeral 1 indicates the gyro compass for which azimuthal check is required. It is arranged that a tilt angle signal shall be delivered from the compass 1 to a filter 2 which is effective to suppress or greatly attenuate any periodic component in this signal, but to allow passage of the steady-state component undisturbed. From filter 2, then, a signal constituted entirely or predominantly by the steady-state component of the original tilt angle signal is passed to an amplifier 3, this amplifier preferably having non-linear characteristics as discussed above. The output from amplifier 3 is delivered to a thermal relay 4 which serves to effect operation of an alarm 5 from a power supply 6 when the steady-state signal reaches a value corresponding to the deviation in azimuth at which it is desired that alarm shall be given.

FIGURE 2 illustrates the case in which a feedback amplifier is employed, the filter being connected in parallel with the amplifier.

As for the various items of apparatus employed in FIGURES 1 and 2, these, as well as ancillary devices for control, may be of a conventional form well known in the art. However, the circuit of FIGURE 3 is given simply for the sake of completeness and illustrates one specific form of gyro compass azimuth monitor which has been successfully operated.

The circuit of FIGURE 3 represents one practical embodiment of the schematic arrangement of FIGURE 2 and the low pass filter 2 thereof being in the feedback line of a non-linear amplifier 3 including tubes V1a, V1b. The amplifier input is the pendulum signal applied through transformer T1, and the amplifier provides a balanced output through tubes V2a, V2b and transformer T3 to the thermal relay 4. The alarm 5 will normally be a buzzer or the like to give an audible warning, but can also or additionally comprise a warning lamp. The power supplies 6 are shown in full as those which supply the amplifier, filter and alarm.

Additional elements of interest are potentiometers P2 and P3 which serve for setting the necessary "datum" at the start of each journey or voyage of the vessel: thus, the indicator functions on a predetermined change from a settled position, such as north, rather than to show that the gyro is occupying its settled postion. Also of interest is potentiometer P1, which is a gain control adjustable between predetermined limits to determine the minimum azimuthal deviation from settled position before the thermal relay and alarm are triggered.

Details of circuit components in FIGURE 3 are as follows:

Resistors

| | | | |
|---|---|---|---|
| R1 | 1.0K Ω, ½w. | R14 | 100 Ω, ½w. |
| R2 | 220K Ω, ½w. | R15 | 270 Ω, ½w. |
| R3 | 1.5K Ω, ½w. | R16 | 270 Ω, ½w. |
| R4 | 1.2K Ω, ½w. | R17 | 270 Ω, ½w. |
| R5 | 10K Ω, ½w. | R18 | 270 Ω, ½w. |
| R6 | 1.0M Ω, ½w. | R19 | 100 Ω, ¼w. |
| R7 | 27K Ω, ½w. | R20 | 100 Ω, ¼w. |
| R8 | 1.8K Ω, ½w. | R21 | 1.5K Ω, ½w. |
| R9 | 220K Ω, ½w. | R22 | 470K Ω, 1w. |
| R10 | 10K Ω, ½w. | R23 | 100 Ω, ⅛w. |
| R11 | 10K Ω, ½w. | R24 | 100 Ω, ⅛w. |
| R12 | 10K Ω, ½w. | R25 | 100 Ω, ⅛w. |
| R13 | 1.0K Ω, 2w. | R26 | 100 Ω, ⅛w. |

Capacitors

| | | | |
|---|---|---|---|
| C1 | 25 μf., 50 v. | C7 | 0.05 μf., 500 v. |
| C2 | 25 μf., 50 v. | C8 | 0.05 μf., 500 v. |
| C3 | 2.0 μf., 500 v. | C9 | 0.01–0.0 μf., 500 v. |
| C4 | 2.0 μf., 500 v. | C10 | 100+100 μf., 6 v. |
| C5 | 2.0 μf., 500 v. | C11 | 1.0 μf., 150 v. |
| C6 | 2.0 μf., 500 v. | | |

Other components

| | |
|---|---|
| Choke L1 | 10 henry, 20 ma. |
| Tube V1a, V1b | 12AX7 |
| Tube V2a, V2b | 12BH7 |
| Tube V3 | 6X4 |
| Diodes, D1–D6 | Z530B |

Transformer T4, on load voltages—primary winding 25 v., secondary windings, from left to right in the drawing, 0.38 v., 5.3 v.–5.3 v., 5.85 v., 308 v.–308 v.

| | |
|---|---|
| Lamp L.G. | 6 v., colored green. |
| Lamp L.R. | 6 v., colored red. |
| Fuses F1, F2 | 20 a., each. |

The gyro compass from which the pendulum signal is derived is not shown in FIGURE 3 for the sake of simplicity since such devices are well known. It is sufficient to note that the known devices have a viscous damped pendulum attached to the gyroscope frame of the compass, the plane of swing of the pendulum being nominally north-south so that the pendulum moves in response to tilting and transient accelerations in its plane by the effects of gravitational and acceleration (d'Alembert) forces on the pendulum bob. An electric signal proportional to the pendulum movement relative to its central untilted position is readily obtained and referred to as the pendulum signal.

We claim:

1. A method of checking azimuthal deviation of a gyroscopic compass from its settled position, which comprises the steps of generating in the compass a pendulum signal variable with the degree of the deviation; substantially suppressing from said pendulum signal may superposed components therein resulting from periodic movements such as may be caused by pitching and rolling of the body on which the compass is mounted and which are of a high frequency, transient nature relative to the frequency of azimuth deviations represented by said pendulum signal; and employing the remaining component of said pendulum signal to provide an indication of the angle of azimuthal deviation.

2. A method according to claim 1, which comprises substantially suppressing superposed components of a frequency in excess of a predetermined value within the range 2–5 cycles per minute.

3. In gyroscopic compass apparatus for use on a body liable to transient accelerations such as may be caused by pitching and rolling: gravity sensitive means for generating an electric signal in response to azimuthal deviation of said compass from a settled position; a low pass filter operable to substantially suppress from said signal periodic components arising from said transient accelerations and of a frequency which is high relative to the frequency of said azimuth deviation; two-state switch means operable to one state in response to the filtered azimuthal deviation signal when such signal is greater than a predetermined value, and otherwise normally operable in its other state; and indicator means connected to said switch means for activation when the latter is in said one state.

4. In a gyroscopic compass apparatus for use on a body liable to transient accelerations such as may be caused by pitching and rolling: gravity sensitive means for generating an electric signal in response to azimuthal deviation of said compass from a settled position; a low pass filter operable to substantially suppress from said signal periodic components arising from said transient accelerations and of a frequency which is high relative to the frequency of said azimuthal deviation, a non-linear amplifier for the filtered signal, and indicator means connected to the output of said amplifier.

5. In gyroscopic compass apparatus for use on a body liable to transient accelerations such as may be caused by pitching, rolling and vibration: gravity sensitive means for generating an electric signal in response to azimuthal deviation of said compass from a settled position; a feedback amplifier for said signal; a low pass filter connected in the feedback circuit of said amplifier, which filter is operable to substantially suppress from said signal periodic components of a high frequency relative to azimuthal deviations; and indicator means connected to the output of said amplifier.

6. In gyroscopic compass apparatus for use on a body liable to transient accelerations such as may be caused by pitching, rolling and vibration: gravity sensitive means for generating an electric signal in response to azimuthal deviation of said compass from a settled position; a low pass filter having a corner frequency in the range 2–5 cycles per minute connected to said gravity sensing means to substantially suppress from said signal periodic components therein arising from said transient accelerations; an amplifier connected to said filter to amplify the filtered signal output therefrom, and indicator means connected to the output of said amplifier.

7. In gyroscopic compass apparatus for use on a body liable to transient accelerations such as may be caused by pitching, rolling and vibration, means for indicating azimuthal deviation of the compass beyond a predetermined limit, comprising: a pendulum adapted to produce an electrical signal having a relatively steady-state component due to tilt of the compass from its settled position and a periodic component due to the transient accelerations; a low pass filter operable to substantially suppress said periodic component from said signal; a non-linear amplifier connected to the output of said filter; two-state switch means connected to the output of said amplifier and operable to one state in response to an amplifier output greater than a predetermined value representing said limit, and otherwise normally operable in its other state; and indicator means connected to said switch means for activation when the latter is in said one state.

8. In gyroscopic compass apparatus for use on a body liable to transient accelerations such as may be caused by pitching, rolling and vibration, means as claimed in claim 7 for indicating azimuthal deviation of the compass beyond a predetermined limit, wherein said amplifier is a feedback amplifier and said filter is connected in the amplifier feedback circuit.

9. In gyroscopic compass apparatus for use on a body liable to transient accelerations such as may be caused by pitching, rolling and vibration, means as claimed in claim 7 for indicating azimuthal deviation of the compass beyond a predetermined limit, wherein said switch means is a thermal relay.

10. In gyroscopic compass apparatus for use on a body liable to transient accelerations such as may be caused by pitching, rolling and vibration, means as claimed in claim 7 for indicating azimuthal deviation of the compass beyond a predetermined limit, further comprising a potentiometer connected between said amplifier and switch means, which potentiometer is operable to effectively adjust said limit.

11. In gyroscopic compass apparatus for use on a body liable to transient accelerations such as may be caused by pitching, rolling and vibration, means as claimed in claim 7 for indicating azimuthal deviation of the compass beyond a predetermined limit, wherein said indicating means includes at least one of audible and visual alarm means.

References Cited by the Examiner

UNITED STATES PATENTS

| | | | |
|---|---|---|---|
| 1,730,951 | 10/1929 | Sperry | 114—144 |
| 2,719,502 | 10/1955 | West | 114—144 |
| 2,841,754 | 7/1958 | Jones | 114—144 X |
| 3,079,107 | 2/1963 | Auld et al. | 33—204 |

FOREIGN PATENTS

| | | |
|---|---|---|
| 1,329,289 | 4/1963 | France. |
| 678,706 | 7/1939 | Germany. |
| 886,423 | 1/1962 | Great Britain. |
| 954,312 | 4/1964 | Great Britain. |

ROBERT B. HULL, *Primary Examiner.*